US008472171B2

(12) United States Patent
Mongia et al.

(10) Patent No.: US 8,472,171 B2
(45) Date of Patent: Jun. 25, 2013

(54) METHOD AND SYSTEM FOR COOLING A COMPUTER DEVICE

(75) Inventors: Rajiv K. Mongia, Santa Clara, CA (US); Krishnakumar Varadarajan, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 258 days.

(21) Appl. No.: 12/905,963

(22) Filed: Oct. 15, 2010

(65) Prior Publication Data
US 2011/0149495 A1 Jun. 23, 2011

(51) Int. Cl.
*G06F 1/16* (2006.01)

(52) U.S. Cl.
USPC ............... 361/679.08; 312/330.1; 454/184; 248/346.01

(58) Field of Classification Search
USPC ......... 361/679.02, 679.33, 679.32, 679.22, 361/679.57, 679.4, 679.31, 679.46, 679.37, 361/679.49, 679.54, 679.41; 312/223.2, 330.1; 454/184, 229, 256, 259; 248/65, 74.1, 74.3, 248/346.01
See application file for complete search history.

(56) References Cited

U.S. PATENT DOCUMENTS

| 4,635,709 | A | 1/1987 | Altoz |
| 5,076,935 | A | 12/1991 | Kraus et al. |
| 5,477,417 | A | 12/1995 | Ohmori et al. |
| 5,886,296 | A | 3/1999 | Ghorbani |
| 6,036,746 | A | 3/2000 | Scovazzo et al. |
| 6,327,144 | B1 * | 12/2001 | May ..................... 361/679.47 |
| 6,544,309 | B1 | 4/2003 | Hoefer |
| 6,552,900 | B1 | 4/2003 | Hoefer et al. |
| 6,783,882 | B2 | 8/2004 | Schmidt |
| 6,804,193 | B1 | 10/2004 | Dubreuil |
| 6,885,554 | B1 | 4/2005 | Reeck et al. |
| 6,900,387 | B2 | 5/2005 | Gravell et al. |
| 6,909,602 | B2 | 6/2005 | Dietrich et al. |
| 6,967,841 | B1 | 11/2005 | Chu et al. |
| 7,112,131 | B2 * | 9/2006 | Rasmussen et al. ......... 454/184 |
| 7,312,984 | B2 | 12/2007 | Richardson et al. |
| 2003/0010490 | A1 | 1/2003 | Reeck |
| 2005/0207114 | A1 | 9/2005 | Gall et al. |

(Continued)

FOREIGN PATENT DOCUMENTS

| EP | 1413943 | 4/2004 |
| JP | 55-33266 | 3/1980 |
| JP | 2005243829 | 9/2005 |

OTHER PUBLICATIONS

FOA Mailed Dec. 15, 2008 for U.S. Appl. No. 11/772,068, Whole Document.

(Continued)

*Primary Examiner* — Hung Duong
(74) *Attorney, Agent, or Firm* — Blakely, Sokoloff, Taylor & Zafman LLP

(57) ABSTRACT

A system and apparatus to draw air for cooling an interior surface in a body of a computer device. In one embodiment, an upward-facing intake of a fan means is at least partially positioned vertically under vent means which are attached to and/or incorporated within an upper exterior surface of the body of the computer device. In another embodiment, air from outside the body of the computer device flows through said vent means and flows directly into the portion of the upper vent, where the vent means includes air-permeable, hydrophobic means to reduce liquid intrusion from the flow of air.

18 Claims, 8 Drawing Sheets

U.S. PATENT DOCUMENTS

2006/0198086 A1 9/2006 Wang
2007/0090176 A1 4/2007 Tracy
2009/0002941 A1* 1/2009 Mongia et al. ............... 361/690

OTHER PUBLICATIONS

PCT ISR and WO Mailed Oct. 30, 2008 for PCT/US2008/068016, Whole Document.

Office Action for Taiwan Patent Application No. 96136769, (Jul. 7, 2010), Whole Document.
USPTO, OA Mailed Aug. 12, 2008 for U.S. Appl. No. 11/772,068, (Aug. 12, 2008), Whole Document.
IPRP Mailed Jun. 29, 2007 for PCT/US2008/068016, Whole Document.
Final Office Action for Taiwan Patent Application No. 096136769, (Feb. 15, 2011), Whole Document.

* cited by examiner

METHOD AND SYSTEM FOR COOLING A COMPUTER DEVICE

CROSS-REFERENCE TO RELATED APPLICATIONS

This application claims priority to Pending India Application No. 2681/DEL/2009, filed on Dec. 22, 2009, entitled "Method And System For Cooling A Computer Device."

BACKGROUND

1. Technical Field

Embodiments relate generally to gas cooling of a computer device. More particularly, some embodiments relate to air cooling of a computer device in which air is directly drawn into a fan means through a hydrophobic membrane attached to an upper exterior surface of the computer device.

2. Background Art

FIG. 1 is a block diagram illustrating a partial cross-sectional view of a body 100 of a computing device, and other select elements of the computing device. The body 100 contains therein various components configured to dissipate heat according to a prior known technique. Body 100 at least partially defines an interior volume from which heat is to be dissipated. For example, the surfaces of one or more structures of body 100 and/or the surfaces of one or more components attached to such structures define an upper interior surface 107a and a lower interior surface 107b facing upper interior surface 107a. An exterior of body 100 is at least partially defined by corresponding upper exterior surface 105a and lower exterior surface 105b. A PC board 130 (and/or components thereon) within body 100 may generate or otherwise conduct heat during some operation of the computing device, where such heat needs to be sufficiently dissipated from body 130 for operation of the computing device.

To dissipate such heat, a fan 110 within body operates to draw air into its various intakes—e.g. an upper intake 115a facing upper interior surface 107a and/or a lower intake 115b facing lower interior surface 107b. Fan 110 is positioned so that it intersects a plane in which PC board 130 is positioned, such that a drawing of air into upper intake 115a contributes to an air flow 120a across a top surface 132a of PC board 130. Air which is drawn into fan 110 through the various intakes flows out of an exhaust 140 as an outflow 175 from the interior volume of body 100. The outflow 175 is directed through a heat exchanger 145 to provide an additional means for dissipating heat from body 100.

An upper exterior surface 105a of body 100—opposite upper interior surface 107a—typically faces upward to some extent during an expected use of the computing device. Upper exterior surface 105a may, for example, incorporate or otherwise position a work surface having one or more I/O devices for user interaction. Conversely, a lower exterior surface 105b of body 100—opposite lower interior surface 107b—typically faces downward to some extent during an expected use of the computing device. In typically facing downward, lower exterior surface 105b is comparatively less likely to be exposed to possible sources of liquid intrusion into the interior volume of body 100. By contrast, in typically facing upward and/or being an area of regular user interaction, upper exterior surface 105a is comparatively more likely to be exposed to possible sources of such liquid intrusion.

Fan 110 is oriented for drawing air vertically up and/or vertically down into itself. For fans so oriented, previous techniques for heat dissipation have positioned such fans so as to avoid the risk of liquid intrusion directly into fan 110. More particularly, fan 110 is positioned in body 100 so that any drawing of air into body 100 does not include directly drawing air into upper intake 115a from upper interior surface 107a. Therefore, previous techniques position upper intake 115a under some air impermeable cover—e.g. area 155 of upper exterior surface 105a which is air impermeable. Moreover, previous techniques for heat dissipation have positioned vents in body 100 to exploit the low risk of liquid intrusion through the downward-facing lower exterior surface 105b. More particularly, a vent 150 is positioned directly under lower exterior surface 105b to allow an air flow 170 from outside body 100, through the adjacent lower interior surface 105b and directly into lower intake 115b.

The positioning of upper intake 115a only under air-impermeable area 155 means that all of the air taken into upper intake 115a has been previously drawn horizontally within body 100—e.g. over PC board 130. By contrast, the positioning of lower intake 115b over vent 150 in the lower exterior surface 105b means that a substantial amount of the air taken into lower intake 115b—e.g. the air of air flow 170—has not been drawn across any other components within body 100. Indeed, the volume of air flow 170 typically limits much or any air flow 120b across a bottom surface 132b of PC board 130. Since flow 120b is not appreciable, previous heat dissipation techniques have not provided effective cooling of the lower side 132b of PC board 130 and/or lower interior surface 107b of body 100.

BRIEF DESCRIPTION OF THE DRAWINGS

The various embodiments are illustrated by way of example, and not by way of limitation, in the figures of the accompanying drawings and in which.

DETAILED DESCRIPTION

Various embodiments described herein relate generally to provide heat dissipation for a computer device. Certain embodiments include techniques and mechanisms for variously drawing air through one or more surfaces in a body of a computer device and into an interior volume which is at least partially defined by said body. In order to convey various features of certain embodiments, various references are made herein to "upper" surfaces, "lower" surfaces and various "vertical" and "horizontal" directions. It is understood that these references are with respect to a given orientation of the computer device in question—e.g. an orientation of the computer device for an expected use of the computer device. For example, an "upper exterior surface" may refer to a surface which is oriented to face vertically upward to some extent when the computer device is oriented for typical user operation—e.g. operating over and upon an upward-facing I/O device of a user work surface attached to or incorporated within the upper surface. Conversely, a "lower exterior surface" may refer to a surface which faces in a direction which is substantially opposite to a direction faced by a corresponding upper exterior surface.

Figure 1:
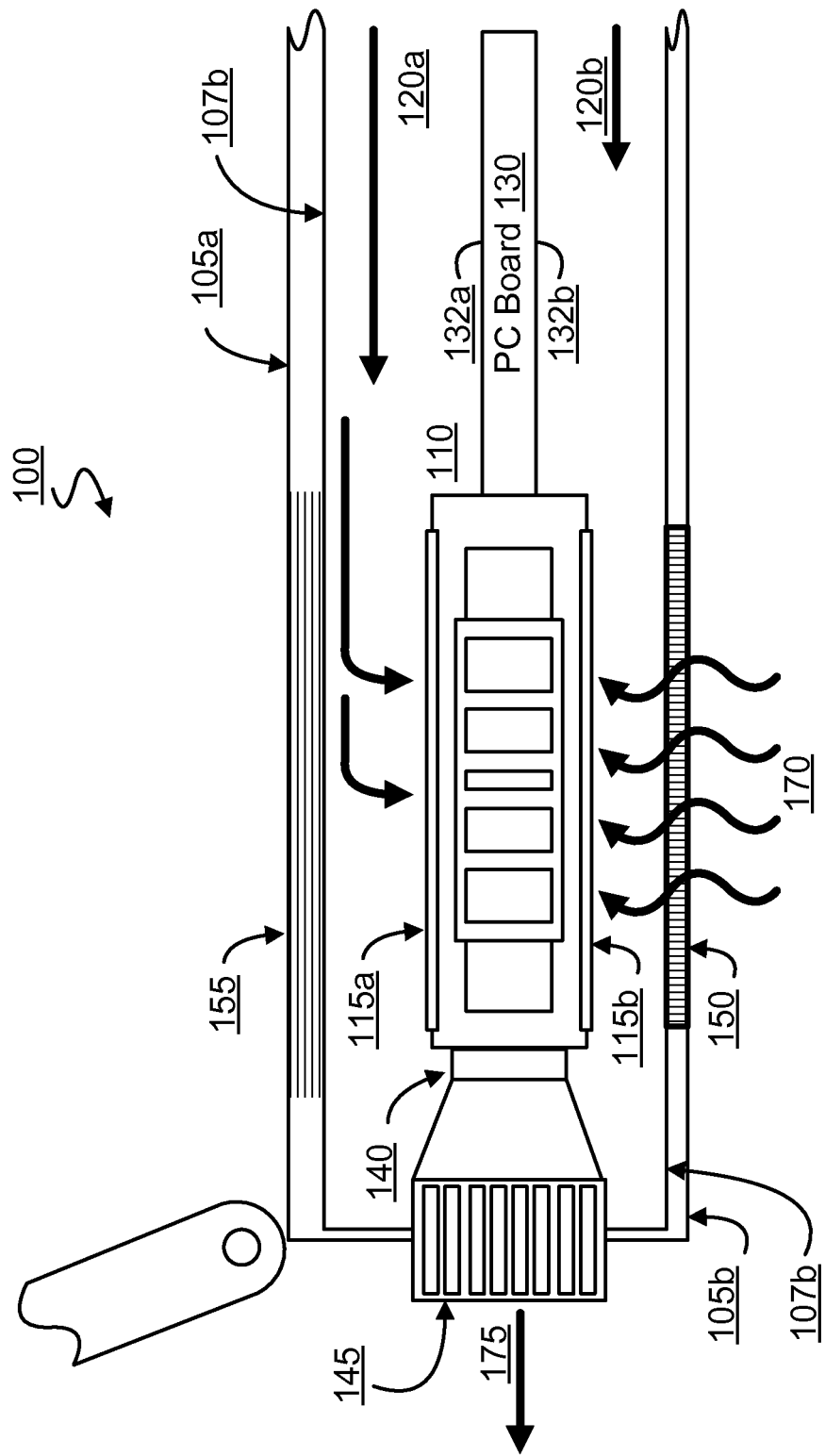
FIG. 1 is a block diagram showing a cross-section view of a computer device body practicing a known heat dissipation technique.
Figure 2:
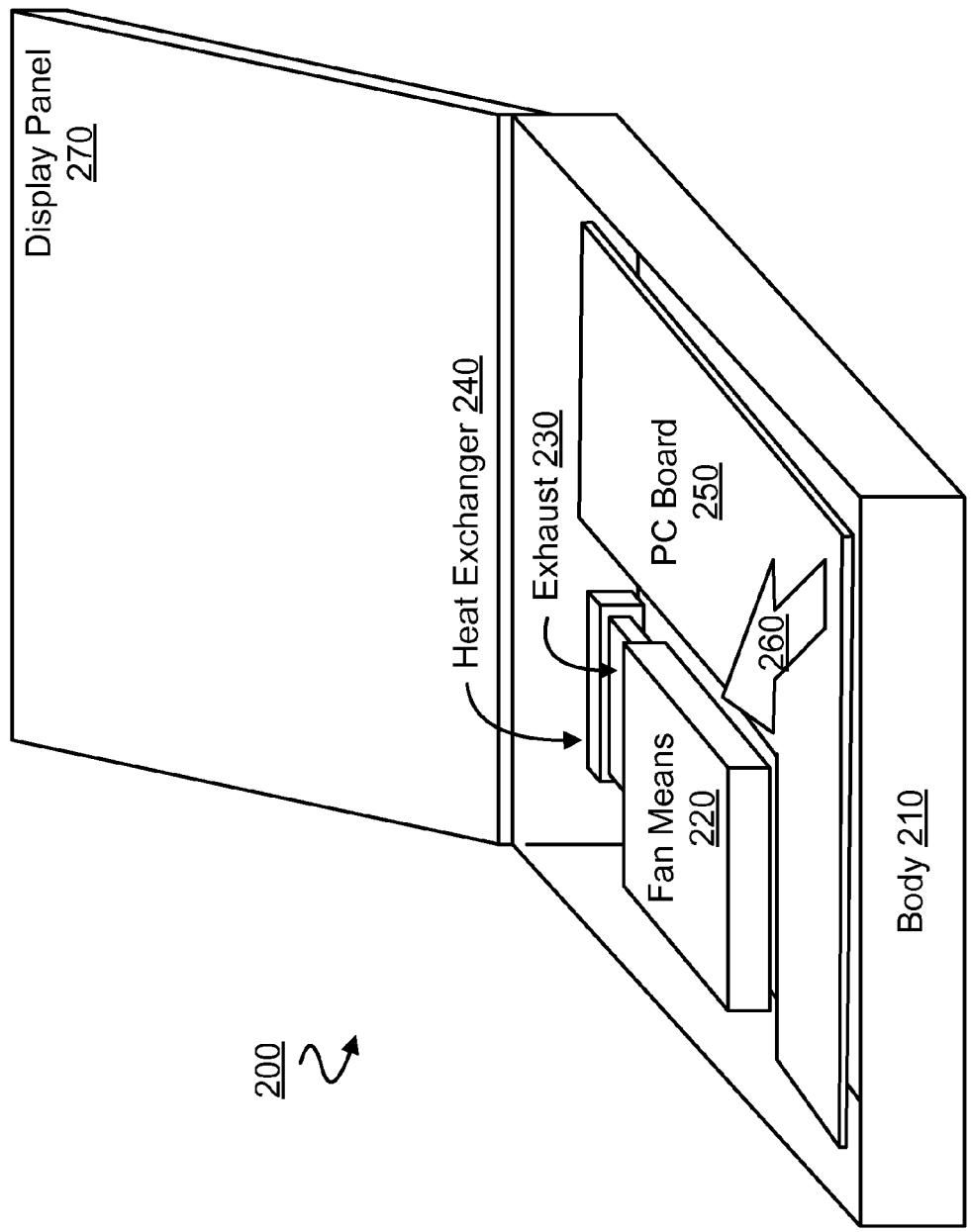
FIG. 2 is a block diagram illustrating select elements of a computing device according to an embodiment.

FIG. 2 is a block diagram illustrating a high-level view of select element of a computer 200 configured for heat dissipation according to an embodiment. Computer 200 may include any of a variety of computing devices including, but not limited to, a laptop, notebook, desktop, server, or other similar device. In an embodiment, computer 200 may include a body 210 which at least partially defines some interior volume of computer 200—e.g. an interior volume having contained therein components of computer 200. Such a space is referred to herein as an interior volume of the body. Body 200 may include part of a casing of computer 200 which, for example, incorporates a work surface for a user of computer 200 to interact with. By way of illustration and not limitation, body 210 may provide a frame for one or more of a keyboard, mousepad, speakers and/or other input/output (I/O) means of computer 200 (not shown). Alternatively or in addition, a display panel 270 may be coupled to an upper surface of body 210.

The interior volume of body 210 may include one or more components which generate or otherwise conduct heat during some operation of computer 200. For example, a printed circuit (PC) board 250 of computer 200 may be positioned in the interior volume of body 210, where the PC board 250 and/or components thereon radiate heat within body 210. To provide heat dissipation from the interior volume of body 210, computer 200 may include fan means 220. Fan means 220 may include any of a variety of combinations of fan devices—e.g. a radial blower, a centrifugal fan, etc.—which operates to generate a flow of air 260 within the interior volume of body 210. By way of illustration and not limitation, the air flow 260 may be drawn across some surface of PC board 250 to provide convective cooling. Air flow 260 may include, for example, one or more of air being drawn into, air being forced out of, and/or air being moved within, the interior volume of body 210. The air flow 260 may, for example, be drawn into fan means 220 and forced out of an exhaust 230 for fan means 230. It is understood that, in various embodiments, fan means 220 may provide any of a variety of combinations of additional and/or alternative paths of air flow (not shown) within the interior volume of body 210. Dissipation of heat from body 210 may be at least partially achieved by sending exhausted air from exhaust 230 through a heat exchanger 240 of computer. Heat exchanger 240 may include one or more heat exchanging means including, but not limited to, any of a variety of combinations of fin, plate and/or shell-and-tube heat exchange structures.

Figure 3:
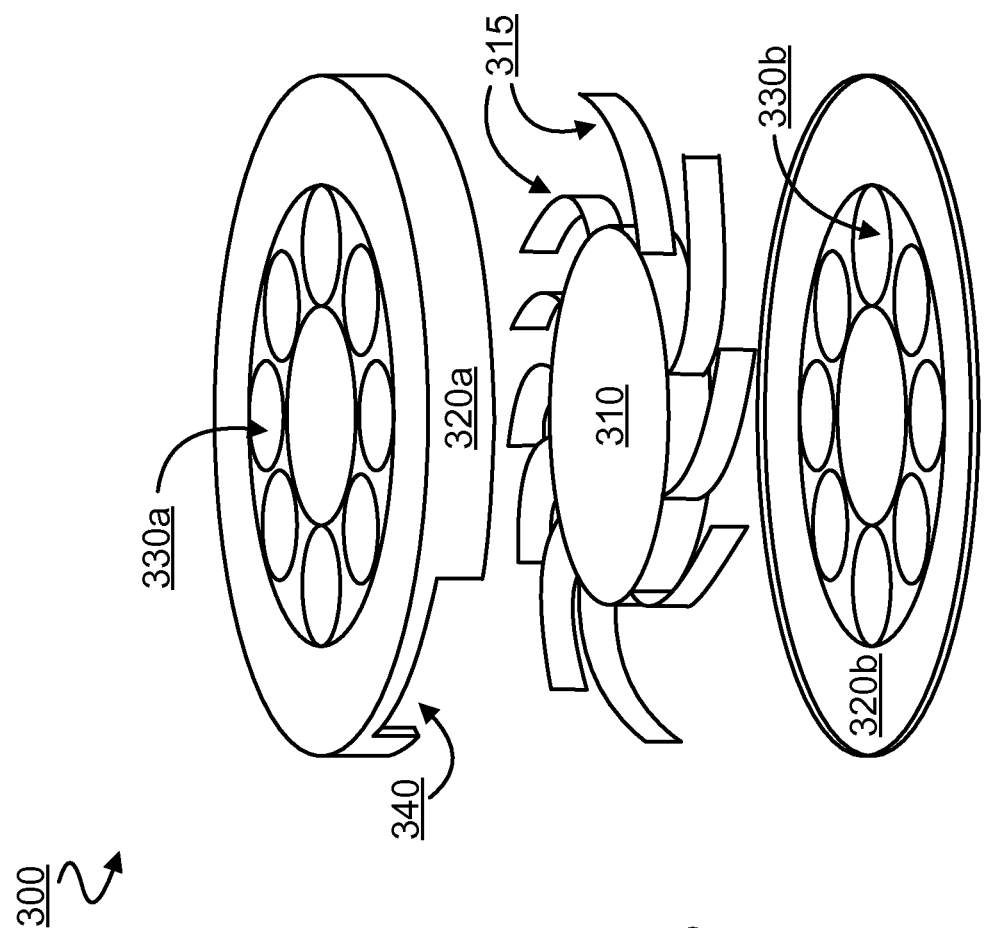
FIG. 3 illustrating select elements of a fan means according to an embodiment.

FIG. 3 is block diagram illustrating a high-level view of select elements of a fan means 300 for dissipating heat according to an embodiment. Fan means 300 may include, provide and/or operate according to one or more features discussed herein with respect to fan means 300, for example.

Fan means 300 may include a blower unit 310 to circulate air within a casing—e.g. with a set of fan blades 315. Fan blades 315 may be arranged in various alternative configurations, such as a drum of blades of a centrifugal fan structure. To illustrate certain features of various embodiments, an example of one casing for fan means 300 is shown in sections as casing section 320a and casing section 320b. Such a casing may include one or more intake means for drawing air into fan means 300. By way of illustration and not limitation, casing section 320a may include one or more upper intakes 330a to allow a flow of air (not shown) to be drawn in a first direction into fan means 300. For example, in an embodiment where fan means 300 is oriented with casing section 320a on a top side of fan means 300, a first flow of air may be drawn vertically down through upper intakes 330a into fan means 300.

Alternatively or in addition, casing section 320b may include one or more lower intakes 330b to allow another flow of air (not shown) to be drawn in a second direction into fan means 300. In an embodiment, this second direction may be opposite to the first direction discussed above. For example, in an embodiment where fan means 300 is oriented with casing section 320b on a bottom side of fan means 300, a second flow of air may be drawn vertically up through lower intakes 330b into fan means 300. It is understood that fan means 300 may include any of a variety of additional or alternative combinations of one or more intake means.

In an embodiment, the casing for fan means 300 may include one or more exhaust means for expelling air from fan means 300. By way of illustration and not limitation, the casing including casing sections 320a, 320b may form an opening 340 which is positioned to direct a flow of exhaust air (not shown) in a particular direction. It is understood that fan means 300 may include any of a variety of combinations of one or more additional or alternative exhaust means.

One or more of various intake means and/or exhaust means of fan means 300 may have respective structures and/or configuration with respect to one another which, in combination with one another, provide a particular desired flow air into and/or out of fan means 300. Moreover, a particular positioning and/or orientation of fan means 300 within an interior volume of a computing device—e.g. within the interior volume of body 210—may variously provide heat dissipation according to techniques of certain embodiments discussed herein. In an embodiment one or more exhaust means of fan means 300 may allow and/or force air from fan means 300 in a direction which is perpendicular to another direction of a flow of air into fan means 300. By way of illustration and not limitation, a flow of air out of fan means 300 through opening 340 may be in a direction which is perpendicular to a direction of air flow into upper intakes 330a and/or a direction of air flow into lower intakes 330b.

Figure 4A:
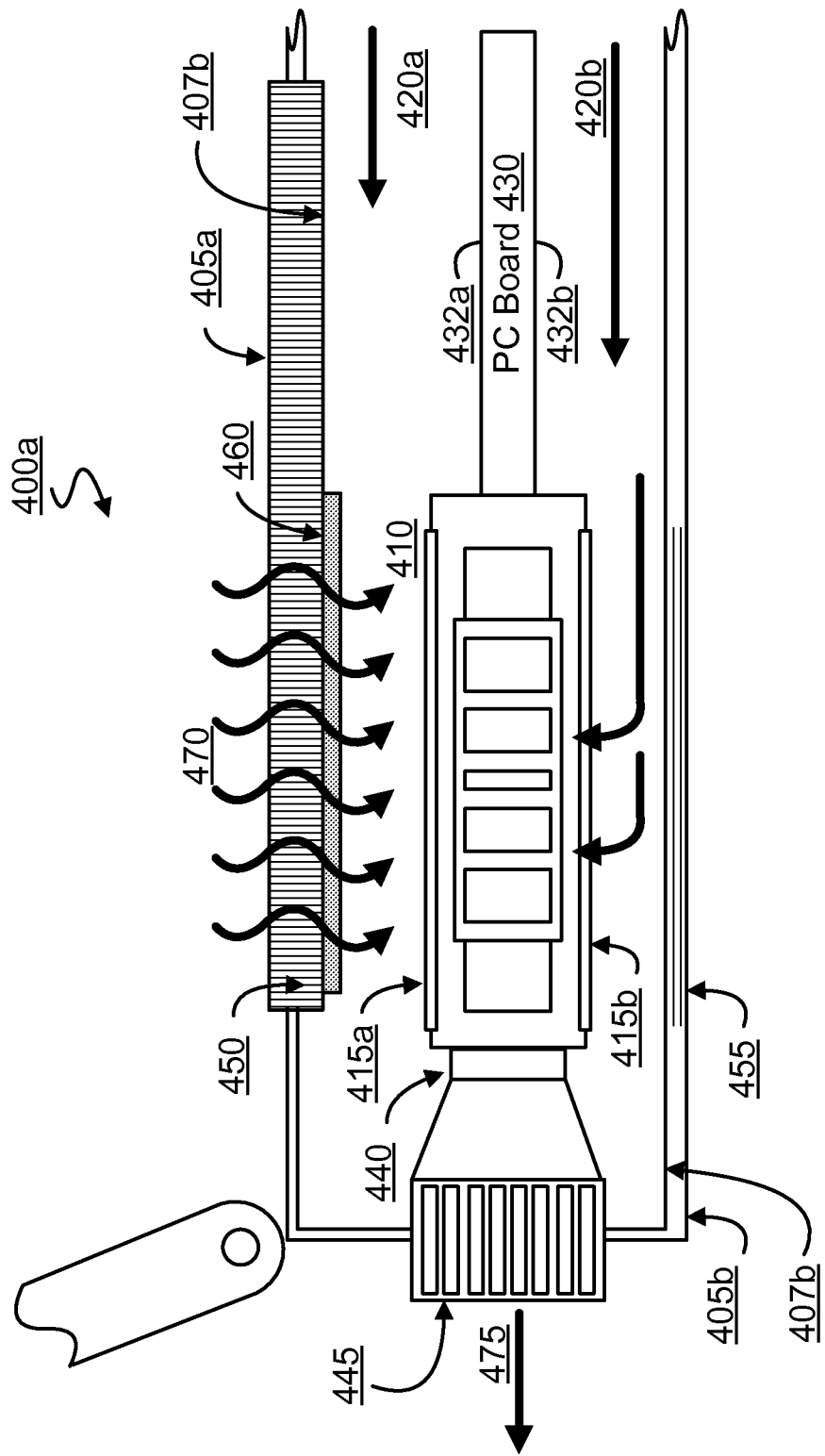
FIG. 4A is a block diagram illustrating select elements of a computer device according to an embodiment.

FIG. 4A is a block diagram illustrating select elements of a body 400a of a computing device according to an embodiment. For the sake of clarity in describing features in various embodiment, certain reference numbers used in the discussion of FIG. 4A are also used in the discussion of FIGS. 4B-4E. It is understood that some feature of one embodiment may also be a feature of another embodiment—e.g. where the same reference number is used to indicate that feature in different respective figures representing the two embodiments.

Body 400a may include various components configured to dissipate heat according to an embodiment. Body 400a may include, couple to, or otherwise position an upper interior surface 407a and a lower interior surface 407b which at least partially define an interior volume from which heat is to be dissipated. A PC board 430 within body 400a—and/or components thereon (e.g. processor, memory devices, power supply, etc.)—may generate or otherwise conduct heat during some operation of the computing device, where such heat needs to be sufficiently dissipated from body 400a. To dissipate such heat, a fan 410 within body 400a may operate to draw air into its various intakes—e.g. an upper intake 415a adjacent to upper interior surface 407a and/or a lower intake 415b adjacent to the lower interior surface 407b. Fan 410 may include some or all of the features of fan means 300, for example. Fan 410 may be positioned so that it intersects a plane in which PC board 430 is positioned, such that upper intake 415a may draw in air of an air flow 420a across a top surface 432a of PC board 430, and/or lower intake 415b may draw in air of an air flow 420b across a bottom surface 432b of PC board 430. Air which is drawn into fan 410 through the various intakes may flow out of an exhaust 440 as an outflow 475 from the interior volume of body 400a. In various embodiments, the outflow 475 may be directed through a heat exchanger 445 to provide an additional means for dissipating heat from body 400a.

An upper exterior surface 405a—opposite upper interior surface 407a—includes one or more surfaces included in, coupled to, or otherwise determined by body 400a which typically face upward to some extent during an expected use/orientation of the computing device. Upper exterior surface 405a may, for example, incorporate or otherwise position a work surface having one or more I/O devices for user interaction. Conversely, lower exterior surface 405b—opposite lower interior surface 407b—includes one or more surfaces included in, coupled to, or otherwise determined by body 400a which typically face downward to some extent during the expected use/orientation of the computing device. In typically facing downward, lower exterior surface 405b is comparatively less likely to be exposed to moisture or other possible sources of liquid intrusion into the interior volume of body 400a. By contrast, in typically facing upward and/or being an area of regular user interaction, upper exterior surface 405a is comparatively more likely to be exposed to moisture or other possible sources of liquid intrusion.

Fan 410 may be oriented for drawing air vertically down into itself from outside the interior volume of 400a during an expected use/orientation of the computing device. For example, a flow of air 470 may be drawn through upper exterior surface 405a and directly into the upper intake 415a—e.g. without the flow of air 470 passing over any other components within the interior volume of body 400a which may need cooling. By way of illustration and not limitation, fan 410 may be positioned so that at least part of upper intake 415a directly faces venting means which are attached to, or otherwise incorporated within, upper interior surface body 405a. It is understood that some or all of upper intake 415a may, additionally or alternatively, directly face other venting means of within upper exterior surface 405a, according to various embodiments.

In an embodiment, such venting means may include an air-permeable keyboard unit 450—e.g. a keyboard and/or frame thereof which includes an opening to allow air to freely flow around keyboard keys (not shown) for ventilation between a topside of the keyboard unit and a bottom side of the keyboard unit. Additionally or alternatively, such venting means may include air-permeable, hydrophobic means. Membrane 460 may represent such air-permeable, hydrophobic means. For brevity, discussion hereafter of various embodiments will include references to "air-permeable, hydrophobic membrane," or simply "membrane". It is understood to one of ordinary skill in the art that descriptions of embodiments referencing an "air-permeable, hydrophobic membrane" (or simply a "membrane") may be extended to apply to any air-permeable, hydrophobic means.

An air-permeable, hydrophobic means may include, but is not limited to, any combination of structures, materials, fabrics, coatings, and/or chemicals which provide both air-permeability and hydrophobicity. The air-permeable, hydrophobic means may provide its air-permeability by virtue of one or more characteristics including but not limited to its chemistry, porosity, structure, weave, thread count, coating, etc.

As used herein, the air-permeable, hydrophobic means are understood to be sufficiently "air-permeable" that the spatial velocity of an air flow through the air-permeable, hydrophobic means is equal to or greater than a minimum spatial velocity for a given pressure differential to which the air-permeable, hydrophobic means is exposed. The method for measuring the air-permeability of the air-permeable, hydrophobic means includes providing a reference pressure differential across the air-permeable, hydrophobic means and measuring to detect whether air flows through the air-permeable, hydrophobic means at a spatial velocity which is equal to or greater than the minimum spatial velocity required for the reference pressure differential provided. It should be noted that an adequate flow air for the computer device may also flow at pressure differentials lower than this provided pressure differential, as in cases where the air-permeable, hydrophobic means are more than sufficiently "air-permeable". A measure of this air permeability can be represented by the "flow parameter," which is the ratio of flow through an area of the air-permeable, hydrophobic means (e.g. measured in $[mm^3/(sec \cdot mm^2)]$, or (mm/sec)) divided by the pressure differential (e.g. measured in Pascals (Pa)) required for the flow. A membrane with a higher flow parameter will have higher air permeability. In certain embodiments, the air-permeable, hydrophobic means is considered to be air-permeable where it has a flow parameter of at least 3.0 mm/(Pa·sec). This first level of air permeability is shown, at least, to support the air flow requirements of most personal computer devices having a transfer means for allowing a flow of air through an interior volume of the personal computer device. In other embodiments, the air-permeable, hydrophobic means is considered to be air-permeable where it has a flow parameter of at least 13.0 mm/(Pa·sec). This second level of air permeability is shown, at least, to support the air flow requirements of most portable computer devices having a transfer means for allowing a flow of air through an interior volume of the portable computer device.

Similarly, the air-permeable, hydrophobic means may provide its hydrophobicity by virtue of one or more characteristics including but not limited to its chemistry, porosity, structure, weave, thread count, coating, etc. Although hydrophobic means may repel any of a number of liquids according to various embodiments, hydrophobicity itself is discussed herein with reference to the propensity to repel water.

The hydrophobicity of an air-permeable, hydrophobic means can be quantified by the minimum amount of water pressure required at an inlet of the air-permeable, hydrophobic means for water to leak through to an outlet of the air-permeable, hydrophobic means. The pressure at which drops of water first appear at an outlet of the air-permeable, hydrophobic means is taken as the water entry pressure of the air-permeable, hydrophobic means. It should be noted that water may also be prevented from intruding at pressures greater than this reference minimum pressure, as in cases where the air-permeable, hydrophobic means are more than sufficiently "hydrophobic". Water entry pressure may be measured in pounds per square inch (psi), for example.

In some embodiments, the air-permeable, hydrophobic means is considered to be hydrophobic where it has a water entry pressure at least as high as 0.02 psi. This first level of hydrophobicity is shown to effectively eliminate any intrusion of water which is presented to the air-permeable, hydrophobic means in the form of incidental exposure such as rain, spray, mist, etc. In other embodiments, the air-permeable, hydrophobic means is considered to be hydrophobic where it has a water entry pressure at least as high as 0.1 psi. This second level of hydrophobicity is shown to effectively eliminate any intrusion of an amount of water which is presented to the air-permeable, hydrophobic means in greater amounts—e.g. by pouring, spilling, etc.—and allowed to pool thereon under its own surface tension.

The air-permeable, hydrophobic means may include a single material and/or structure formed so as to be both air-permeable and hydrophobic, for example. The air-permeable, hydrophobic means may alternatively or additionally include plural, separate component means which are positioned in series with respect to a flow of air. The air-permeable, hydrophobic means may alternatively or additionally include plural, layered component means which are positioned adjacent to one another. The air-permeable, hydrophobic means may alternatively or additionally include plural, laminate component means which are chemically and/or mechanically held together. The air-permeable, hydrophobic means may alternatively or additionally include one or more of a mesh, a woven fibrous material, a non-woven fibrous material and a porous non-fibrous material.

In various embodiments, an air-permeable, hydrophobic membrane may be made of any of a variety of hydrophobic materials. The variety of hydrophobic materials may include, but are not limited to, various types of hydrophobic polymers and copolymers. These polymers and copolymers include hydrophobic fluoropolymers such as polyvinylfluoride, fluorinated ethylene/propylene (FEP), tetrafluoroethylene/perfluoroalkyl perfluorovinylether copolymer (PFA), polytetrafluoroethylene (PTFE), polyethylene terephthalate (PET) etc. Some commercial products which comprise PTFE and/or PET and which are effective in implementing various embodiments include, but are not limited to, Gore-Tex® and Teflon®. The variety of hydrophobic materials also includes siloxanes and polymerized siloxanes (polysiloxanes) such as polydimethylsiloxane (PDMS) and silicone resins. Each of these materials may variously be used, for example, to form a hydrophobic structure of a membrane and/or to form a hydrophobic coating on a structure of a membrane.

As mentioned above, at least part of upper intake 415a of fan 410 may directly face venting means within or attached to upper interior surface 407a, whereby a flow of air 470 may be drawn through upper exterior surface 405a and directly into upper intake 415a. Additionally or alternatively, the positioning of fan 410 may prohibit any flow of air from being drawn through lower interior surface 407b and directly into lower intake 415b. For example, some air impermeable area 455 of lower exterior surface 405b may be positioned under lower intake 415b such that any air taken into lower intake 415b is first drawn across components within body 300—e.g. PC board 430 and/or components thereon—which are thereby cooled. The positioning of lower intake 415b entirely over air impermeable area 455 of lower exterior surface 405b results in a high volume of air flow 420b, which increases air flow across, and cooling of, the lower exterior surface 432b of PC board 430 and/or the lower interior surface 407b.

Figure 4B:
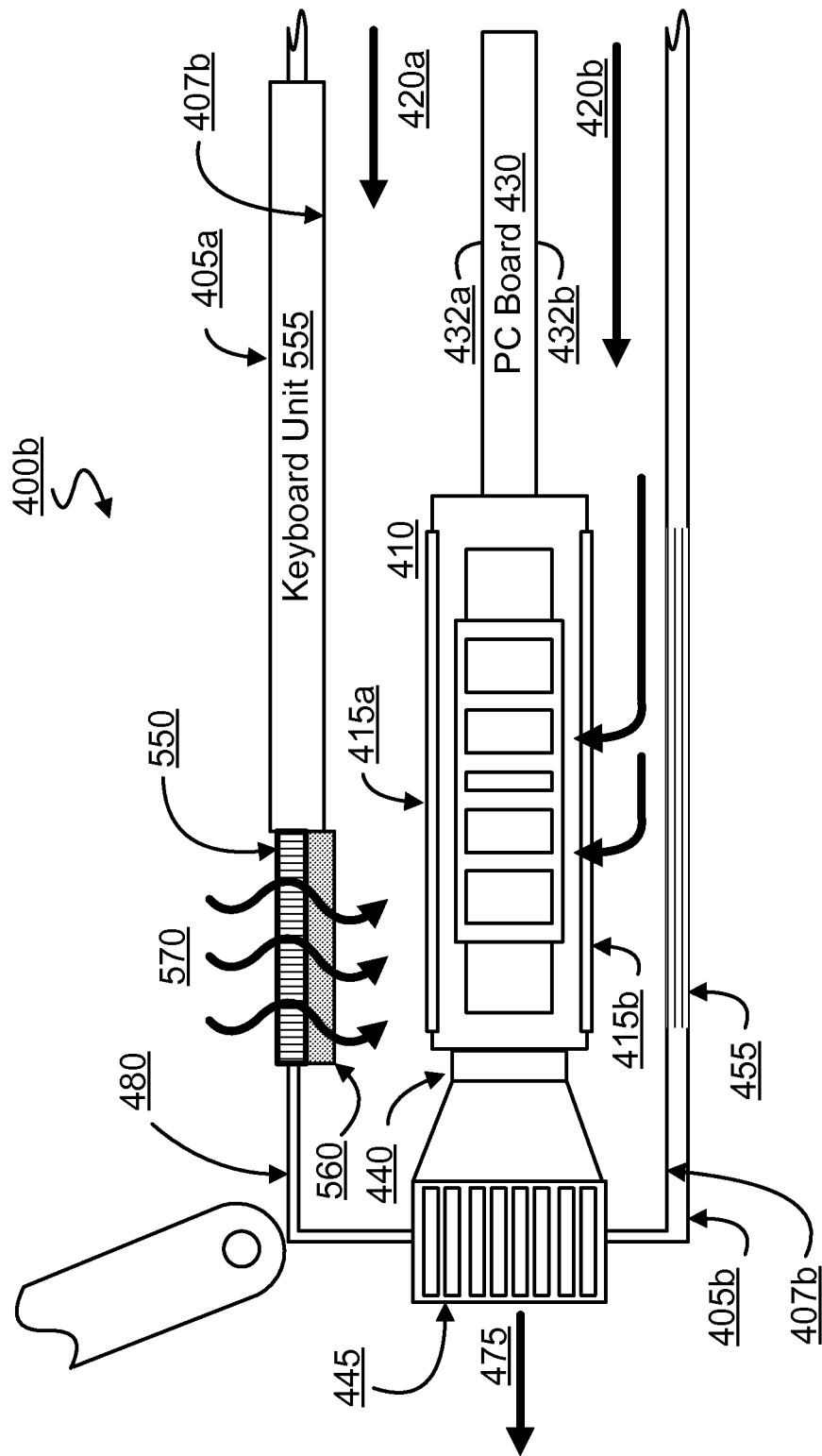
FIG. 4B is a block diagram illustrating select elements of a computer device according to an embodiment.

FIG. 4B is a block diagram illustrating select elements of a body 400b of a computing device according to an embodiment. Body 400b includes a configuration of components which provide an additional or alternative technique by which air may be drawn through upper interior surface 407a and directly into the upper intake 415a of fan 410. More particularly, fan 410 may be positioned so that at least part of upper intake 415a directly faces other venting means within upper exterior surface 405a. Such other venting means may include an opening—e.g. vent 550—within a bezel 480 of upper exterior surface 405a. Additionally or alternatively, such vent means may include a membrane 560 coupled to (e.g. under or above) vent 550. Membrane 560 may comprise an air-permeable, hydrophobic material means, as described above. In an embodiment, vent 550 may be located next to a keyboard unit 555 which may, for example, include some or all of the vent means discussed with respect to FIG. 4A. However, it is understood that unless indicated otherwise, venting means discussed herein with respect to one embodiment may not be limiting as to the presence or absence of venting means discussed herein with respect to another embodiment.

By positioning upper intake 415a to directly face, and draw air from, venting means including vent 550 and membrane 560, fan 410 may directly draw large volumes of cool air from outside body 400b—e.g. including air flow 570—while at the same time enjoying a reduced risk of liquid intrusion into fan 410, due to membrane 560. Moreover, the positioning of lower intake 415b entirely over air impermeable area 455 of lower exterior surface 405b provides for air flow 420b to send a large volume of air into lower intake 415b, and consequently an efficient cooling of the lower exterior surface 432b of PC board 430 and/or the lower interior surface 407b.

Figure 4C:
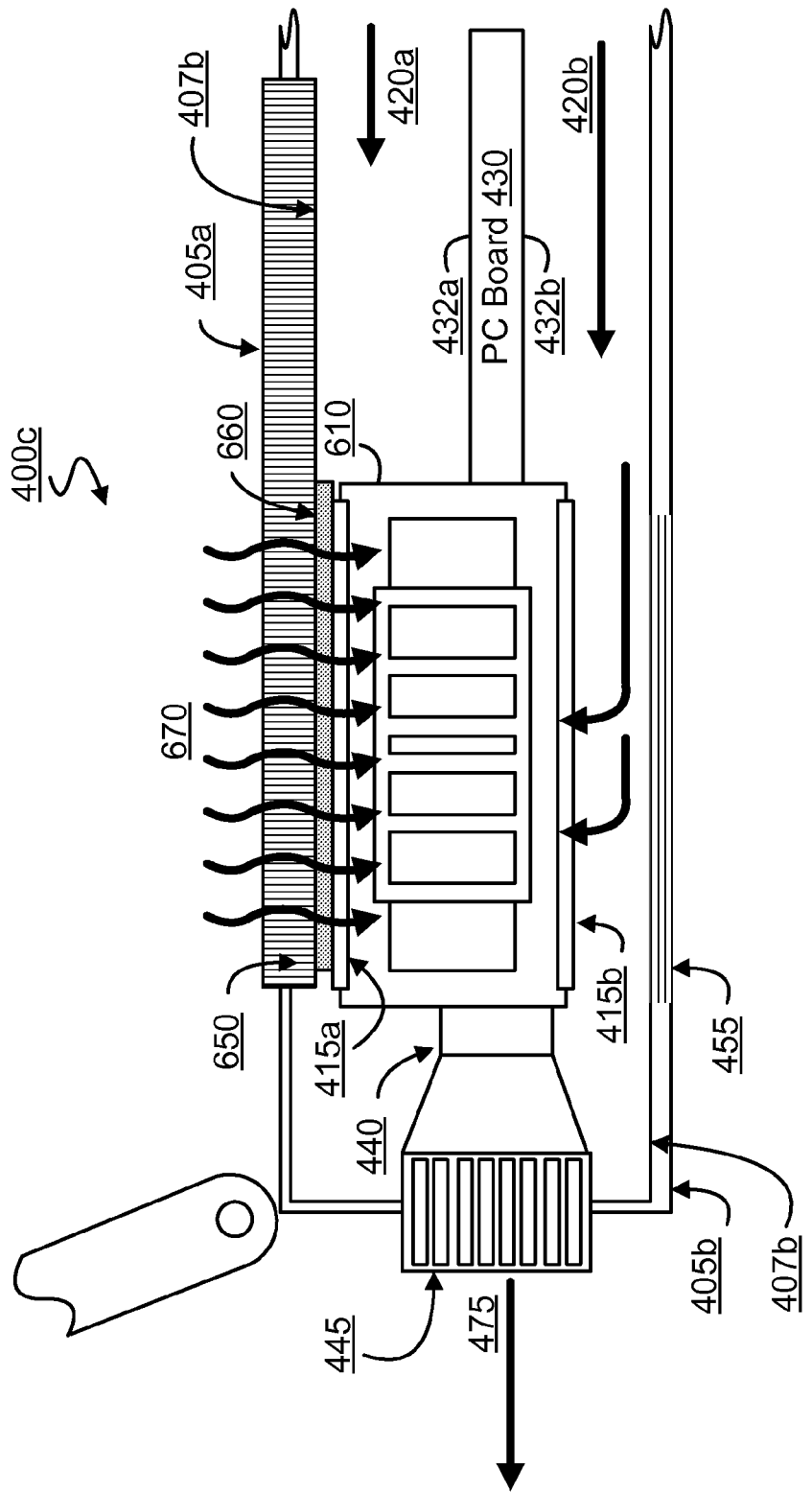
FIG. 4C is a block diagram illustrating select elements of a computer device according to an embodiment.

FIG. 4C is a block diagram illustrating select elements of a body 400c of a computing device according to an embodiment. Body 400c includes a configuration of components which provide an additional or alternative technique by which air may be drawn through upper interior surface 407a and directly into the upper intake 415a of fan 410. More particularly, a fan 610 may be positioned within body 400c so that an upper intake 415a of fan 610 is facing—and is further in contact with—venting means which are connected to or otherwise incorporated within upper exterior surface 405a. For example, fan 610 may be in contact with a structure at an edge of an opening of the venting means.

In an embodiment, such venting means may include an air-permeable keyboard unit 650 which, for example, may include some or all of the features of keyboard unit 450. Additionally or alternatively, such venting means may include air-permeable, hydrophobic means such as membrane 660. In positioning at least some portion of upper intake 415a of fan 610 in contact with venting means, effectively all air drawn into that portion is from outside of body 400c. In various embodiments, little or no air in the flow 420a across the top surface 432a of PC board 430 will directly flow into upper intake 415a. However, the relatively large fan 610 and the resulting large volume of air in air flow 670 may significantly improve the outflow 475—e.g. providing an increased cooling effect on heat exchanger 445. Additionally or alternatively, the low air flow 420a may be offset by the large air flow 420b which the relatively large fan 610 draws across the lower exterior surface 432b of PC board 430 and/or lower interior surface 407b.

Figure 4D:
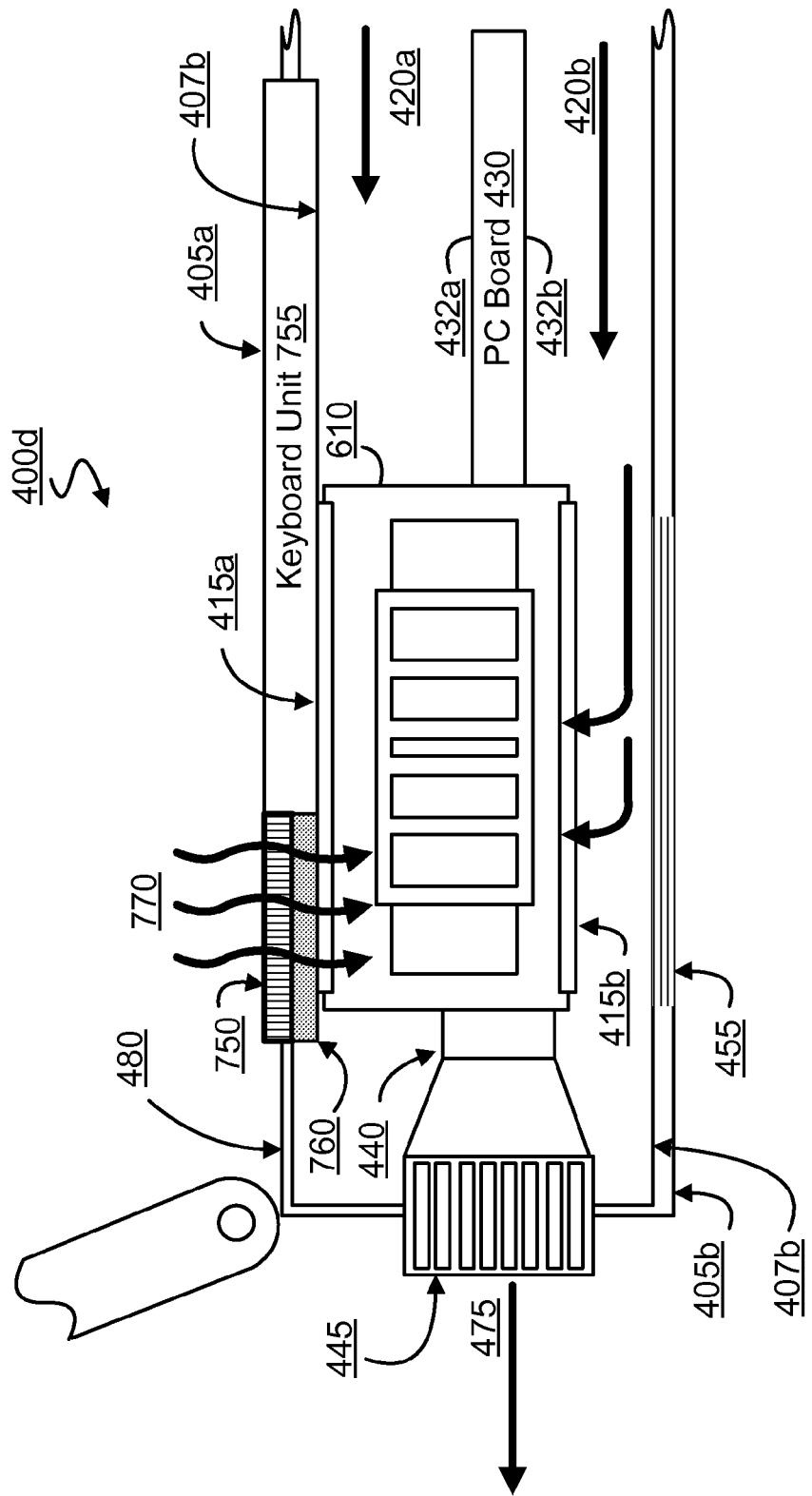
FIG. 4D is a block diagram illustrating select elements of a computer device according to an embodiment.

FIG. 4D is a block diagram illustrating select elements of a body 400d of a computing device according to an embodiment. Body 400d includes a configuration of components which provide an additional or alternative technique by which air may be drawn through upper interior surface 407a and directly into the upper intake 415a of fan 610. Similar to the case of FIG. 4C, a fan 610 may be positioned within body 400d so that an upper intake 415a of fan 610 is facing—and is further in contact with—venting means which are connected to or otherwise incorporated within upper interior surface 407a. The venting means of upper exterior surface 405a may include, for example, a vent 750 within bezel 480 of upper exterior surface 405a. Additionally or alternatively, such vent means may include a membrane 760 coupled to (e.g. under or above) vent 750. Membrane 760 may consist of an air-permeable, hydrophobic material means, as described above. In an embodiment, vent 750 may be located next to a keyboard unit 755 which may, for example, include some or all of the vent means discussed with respect to FIG. 4A.

In positioning at least some portion of upper intake 415a of fan 610 in contact with venting means of upper interior surface 407a, effectively all air drawn into that portion is from outside of body 400d. In various embodiments, little or no air in the flow 420a across the top surface 432a of PC board 430 will directly flow into upper intake 415a. However, the relatively larger fan 610 and the resulting large volume of air in air flow 770 may significantly improve the outflow 475—e.g. providing an increased cooling effect on heat exchanger 445. Additionally or alternatively, the low air flow 420a may be offset by the large air flow 420b which the comparatively large fan 610 draws across the lower exterior surface 432b of PC board 430 and/or lower interior surface 407b.

Figure 4E:
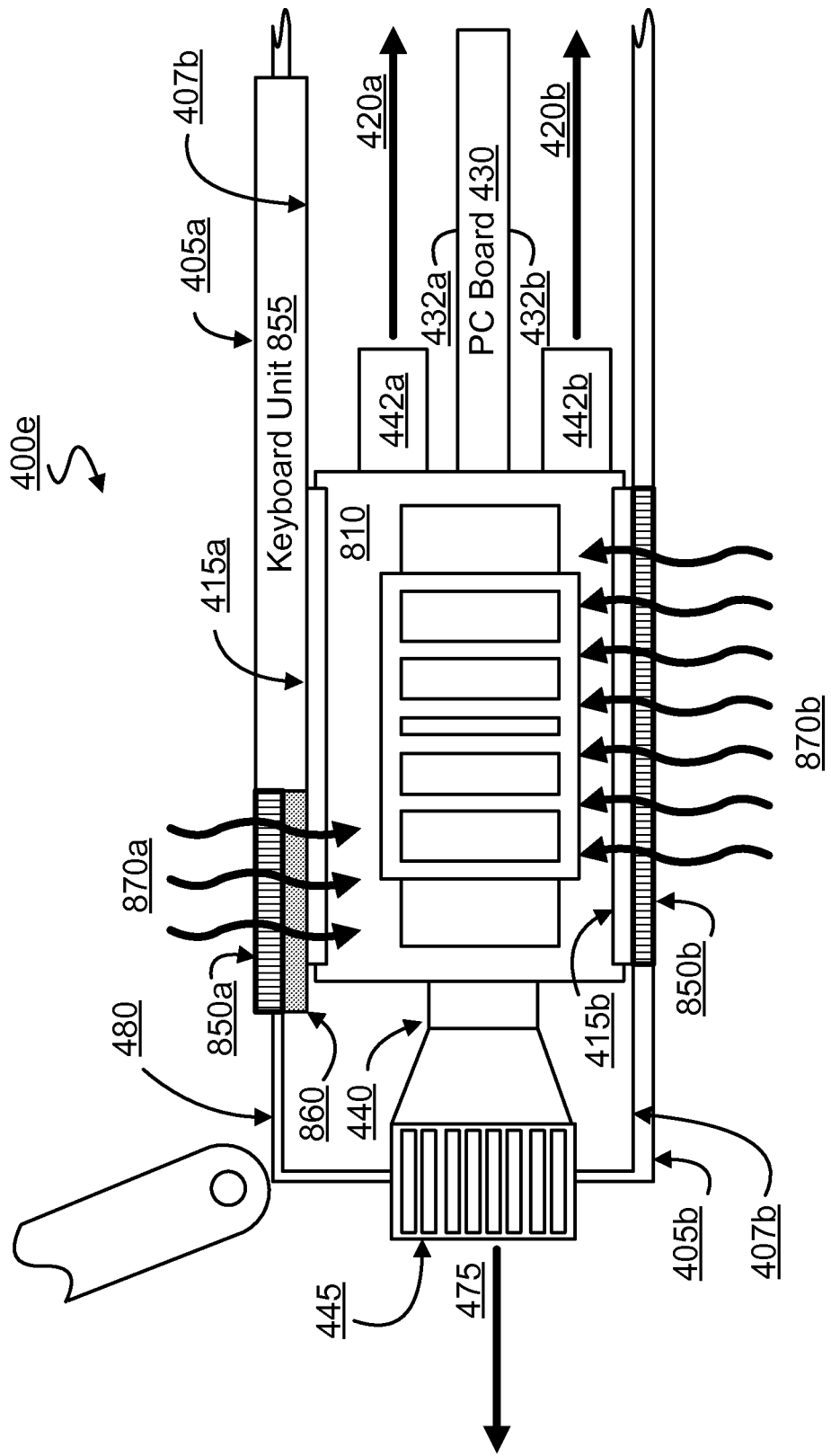
FIG. 4E is a block diagram illustrating select elements of a computer device according to an embodiment.

FIG. 4E is a block diagram illustrating select elements of a body 400e of a computing device according to an embodiment. Body 400e includes a configuration of components which provide an additional or alternative technique by which air may be drawn through upper interior surface 407a and directly into the upper intake 415a of fan 410. Similar to the case of FIG. 4D, a fan 810 may be positioned within body 400e so that an upper intake 415a of fan 810 is facing—and is further in contact with—venting means which are connected to or otherwise incorporated within upper exterior surface 405a. The venting means of upper exterior surface 405a may include, for example, a vent 850a within bezel 480 of upper exterior surface 405a. Additionally or alternatively, such vent means may include a membrane 860 coupled to (e.g. under or above) vent 850a. Membrane 860 may consist of an air-permeable, hydrophobic material means, as described above. In an embodiment, vent 850a may be located next to a keyboard unit 855 which may, for example, include some or all of the vent means discussed with respect to FIG. 4A.

Furthermore, fan 810 may be sufficiently large of for at least a portion of its lower intake 415b to be facing, and in contact with, venting means connected to and/or incorporated within lower exterior surface 405b. By way of illustration and not limitation, lower exterior surface 405b may include a vent 850a which is in contact with at least a portion of lower intake 415b.

In positioning at least some portion of upper intake 415a of fan 810 in contact with venting means of upper exterior surface 405a, effectively all air drawn into that portion of upper intake 415a is an air flow 870a from outside of body 400e. Similarly, in positioning at least some portion of lower intake 415b of fan 810 in contact with venting means of lower exterior surface 405b, effectively all air drawn into that portion of lower intake 415b is an air flow 870b from outside of body 400e.

Due to the comparatively large fan 810 and the comparatively large air flows 870a, 870b, the capacity to exhaust air from fan 810 is increased. In various embodiments, one or more techniques may be used to avail of this increased exhaust capacity. By way of illustration and not limitation, a large outflow 475 from the interior volume of body 400e may provide very effective cooling of heat exchanger 445. Additionally or alternatively, an exhaust 442a from fan 810 may direct exhaust air to such that air flow 420a over surface 432a actually moves away from fan 810, e.g. to be circulated through and/or from the interior volume by other vent means (not shown). Additionally or alternatively, another exhaust 442b from fan 810 may direct exhaust air to such that air flow 420b—across the lower exterior surface 432b of PC board 430 and/or lower interior surface 407b—actually moves away from fan 810, e.g. to be circulated through and/or from the interior volume by other vent means (not shown).

Techniques and architectures for cooling a computer device are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to per-form the required method steps. The required structure for a variety of these systems will appear from the description herein. In addition, certain embodiments are not described with reference to any particular programming language. It will be appreciated that a variety of programming languages may be used to implement the teachings of certain embodiments as described herein.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A computer device comprising:
a body to define at least in part an interior volume of the computer device, wherein an upper interior surface of the body includes an upper opening to allow a flow of air into the interior volume; and
a fan within the interior volume of the computer device, wherein at least a portion of an upper intake of the fan faces the upper opening, the fan to move air through the interior volume, wherein the flow of air is drawn into the upper intake directly after being drawn through the upper opening and an air-permeable, hydrophobic membrane.

2. The computer device of claim 1, wherein the upper opening is incorporated into a keyboard unit of the computing device.

3. The computer device of claim 1, wherein the upper opening is incorporated into a bezel of the computing device, the bezel adjacent to a keyboard of the computing device.

4. The computer device of claim 1, wherein the upper intake is in contact with an edge of the upper opening.

5. The computer device of claim 4, wherein a lower interior surface of the body includes a lower opening to allow another flow of air into the interior volume, wherein the fan further includes a lower intake in contact with an edge of the lower opening, wherein the fan to move air through the interior volume further includes the fan to draw air into the lower intake directly after being drawn through the lower opening.

6. The computer device of claim 1, wherein the fan further includes a lower intake directly facing a lower interior surface of the interior volume, wherein any air drawn into the lower intake is not directly drawn into the lower intake from any opening in the lower interior surface.

7. The computer device of claim 6, wherein air drawn into the lower intake includes air drawn across the lower interior surface.

8. The computer device of claim 6, further comprising a printed circuit (PC) board, wherein air drawn into the lower intake includes air drawn across a surface of the PC board.

9. The computer device of claim 6, wherein the upper intake is in contact with a structure defining the opening.

10. A computer device comprising:
fan means for moving air through an interior volume of the computer device, wherein an upper interior surface of the interior volume includes an upper opening to allow a vertical flow of air downward into the interior volume; and
an upper intake of the fan means, the upper intake directly facing the upper opening, wherein the fan means for moving air includes means for drawing the vertical flow of air into the upper intake directly after the vertical flow of air being drawn through the upper opening and an air-permeable, hydrophobic membrane.

11. The computer device of claim 10, wherein the upper opening is incorporated into a keyboard unit of the computing device.

12. The computer device of claim 10, wherein the upper opening is incorporated into a bezel of the computing device, the bezel adjacent to a keyboard of the computing device.

13. The computer device of claim 10, wherein the upper intake is in contact with an edge of the upper opening.

14. The computer device of claim 13, wherein a lower interior surface of the body includes a lower opening to allow another flow of air into the interior volume, wherein the fan means further includes a lower intake in contact with an edge of the lower opening, wherein the fan means further includes means for drawing air into the lower intake directly after being drawn through the lower opening.

15. The computer device of claim 10, wherein the fan further includes a lower intake directly facing a lower interior surface of the interior volume, wherein any air drawn into the lower intake is not directly drawn into the lower intake from any opening in the lower interior surface.

16. The computer device of claim 15, wherein air drawn into the lower intake includes air drawn across the lower interior surface.

17. The computer device of claim 15, further comprising a printed circuit (PC) board, wherein air drawn into the lower intake includes air drawn across a surface of the PC board.

18. The computer device of claim 15, wherein the upper intake is in contact with a structure defining the opening.

* * * * *